US008718408B2

(12) United States Patent
Karlov et al.

(10) Patent No.: US 8,718,408 B2
(45) Date of Patent: May 6, 2014

(54) ADAPTIVE FILTERING FOR IMAGE TRANSFORM PROCESSES

(71) Applicant: Microsoft Corporation, Redmond, WA (US)

(72) Inventors: Donald D. Karlov, North Bend, WA (US); Ashraf A. Michail, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 14/061,622

(22) Filed: Oct. 23, 2013

(65) Prior Publication Data

US 2014/0043351 A1    Feb. 13, 2014

Related U.S. Application Data

(62) Division of application No. 11/940,023, filed on Nov. 14, 2007, now Pat. No. 8,594,465.

(51) Int. Cl.
*G06K 9/00*    (2006.01)
*G06K 9/32*    (2006.01)

(52) U.S. Cl.
USPC .......................................... 382/300; 382/162

(58) Field of Classification Search
None
See application file for complete search history.

(56) References Cited

U.S. PATENT DOCUMENTS

| 6,295,087 | B1* | 9/2001 | Nohda | 348/234 |
|---|---|---|---|---|
| 6,760,489 | B1* | 7/2004 | Kuwata | 382/300 |
| 8,594,465 | B2* | 11/2013 | Karlov et al. | 382/300 |
| 2003/0147564 | A1* | 8/2003 | Lee | 382/300 |
| 2005/0094899 | A1* | 5/2005 | Kim et al. | 382/300 |
| 2008/0259799 | A1* | 10/2008 | van Beek | 370/235 |

OTHER PUBLICATIONS

Chang, E.—"Color Filter Array Recovery Using a Threshold-based Variable Number of Gradients"—SPIE 1999, pp. 36-43.*

* cited by examiner

*Primary Examiner* — Bernard Krasnic
(74) *Attorney, Agent, or Firm* — Tony Azure; Peter Taylor; Micky Minhas

(57) ABSTRACT

Adaptive filtering techniques are set forth that improve video playback performance. A color similarity metric is computed for source pixels undergoing an image transform operation to determine color values of a target pixel location. The value of the color similarity metric defines what algorithm is used to determine the color values of the target pixel location from the source pixels. While the computation of the color similarity metric introduces additional instructions for each pixel, going against conventional wisdom, enormous performance savings by avoiding unnecessarily complex sets of interpolation instructions where a simpler instruction set suffices, outweighs any such cost from additional instructions.

17 Claims, 14 Drawing Sheets

$D = f(d1, d2, d3)$

Color Similarity Metric 1140 = f (D1, D2, D3, D4, D5, D6)

Color Similarity Metric 1142 at Pixel 1100 ~= f (D1, D2, D5)

ADAPTIVE FILTERING FOR IMAGE TRANSFORM PROCESSES

CROSS-REFERENCE TO RELATED APPLICATIONS

This application is a divisional of U.S. patent application Ser. No. 11/940,023, filed Nov. 14, 2007, entitled "ADAPTIVE FILTERING FOR IMAGE TRANSFORM PROCESSES," which is incorporated herein by reference in its entirety.

TECHNICAL FIELD

The subject disclosure relates to intelligent or adaptive systems and processes for transforming image data, such as, but not limited to, intelligent re-sampling, re-sizing or anisotropic filtering of image data.

BACKGROUND

By way of background concerning conventional systems, when transforming source image data to target image data, where the number of pixels in the source image data and the target image data differ, a re-sizing or re-sampling operation is performed since the source pixels do not map exactly to target pixels on a one-to-one basis. For instance, when rendering video data on a computer from source video data to a software media player, the target pixel space as viewed on screen of the computer typically differs from the source pixel space, and thus the images represented in the source video data are re-sampled to fit the target pixel space for proper viewing. In some cases, a user can change the on-screen pixel space on the fly in which case the ability to dynamically re-size image data for display quickly is desirable.

Today, this re-sizing or re-sampling operation is performed by determining a destination pixel value, for each given pixel location in the target, by interpolating with respect to some region of pixels defined in the source image that correspond to the destination pixel's location. Designers are presented with a variety of different fixed filtering algorithms for performing such interpolation, each having varying complexity, cost and performance tradeoffs. In this regard, today, designers of rendering systems select one of the fixed algorithms according to differing performance tradeoff characteristics for performing this re-sizing or re-sampling operation, typically designing for a worst case, or optimizing speed versus complexity for a given application. However, such choice can result in an overly complex implementation for simple image data, performing a lot of unnecessary work and, on the flip side, such choice can result in an overly simple implementation that produces too many unacceptable artifacts when transforming complex image data.

Accordingly, it would be desirable to provide an improved algorithm for transforming video or image data that does not blindly apply a pre-selected transform algorithm for all image data, thereby limiting performance to that of the pre-selected algorithm. The above-described deficiencies of using conventional video or image transform algorithms are merely intended to provide an overview of some of the problems of conventional systems, and are not intended to be exhaustive. Other problems with the state of the graphics art and corresponding benefits of the various non-limiting embodiments may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, to be extensive or exhaustive. Instead, the sole purpose of this summary is to present some concepts related to some exemplary non-limiting embodiments in a simplified form as a prelude to the more detailed description of the various embodiments that follows.

In various embodiments, adaptive filtering techniques are set forth that improve video playback performance. A color similarity metric is computed for source pixels undergoing an image transform operation to determine color values of a target pixel location. The value of the color similarity metric defines what algorithm is selected to determine the color values of the target pixel location from the source pixels. While the computation of the color similarity metric introduces additional instructions for each pixel, going against conventional wisdom, enormous performance savings by avoiding unnecessarily complex sets of interpolation instructions where a simpler instruction set suffices, outweighs any such cost from additional instructions. As described for various embodiments of the adaptive filtering of image data, in addition to video playback, the notion of the color similarity metric can be applied effectively to a wide variety of graphics contexts.

BRIEF DESCRIPTION OF THE DRAWINGS

Various embodiments of adaptive filtering for image transform processes are further described with reference to the accompanying drawings in which:

FIG. 3 is a block diagram illustrating a process for selecting a pixel transform algorithm based on whether color values of pixels in a source image are substantially similar;

FIG. 5 is a flow diagram illustrating a set of acts in a computing system for selecting a pixel transform algorithm based on whether color values of pixels in a source image are substantially similar;

FIG. 7 is a block diagram illustrating a process for selecting a blending algorithm for an anisotropic filtering process based on whether color values of pixels in a segment in a source image are substantially similar;

FIG. 8 is a flow diagram illustrating a set of acts for selecting a blending algorithm for an anisotropic filtering process based on whether color values of pixels in a segment in a source image are substantially similar;

DETAILED DESCRIPTION

Overview

As discussed in the background, when images are rendered, they often undergo a change in dimension and/or perspective from the pixels represented in the source image to the pixels represented in the target image, such as due to a change from source image resolution to display resolution. In such cases, any time the location of a pixel in the target image does not correspond exactly with the location of a pixel in the source image on a one-to-one basis, a re-sampling operation is typically performed, which can be any algorithm to determine resultant color values for each pixel of the target image, e.g., a nearby pixel, a blend of nearby pixels in the source image, a windowed filter applied across some or all of the pixels of the source image, etc.

Similarly, most of the time, when drawing a textured shape on screen, the texture is not displayed exactly as it is stored without any re-sampling of the texels. As a result, most pixels end up using a point on the texture that is 'between' texels. An exemplary non-limiting image transform operation that re-sizes or re-samples a source image to a target image is illustrated generally in FIG. 1.

Figure 1:
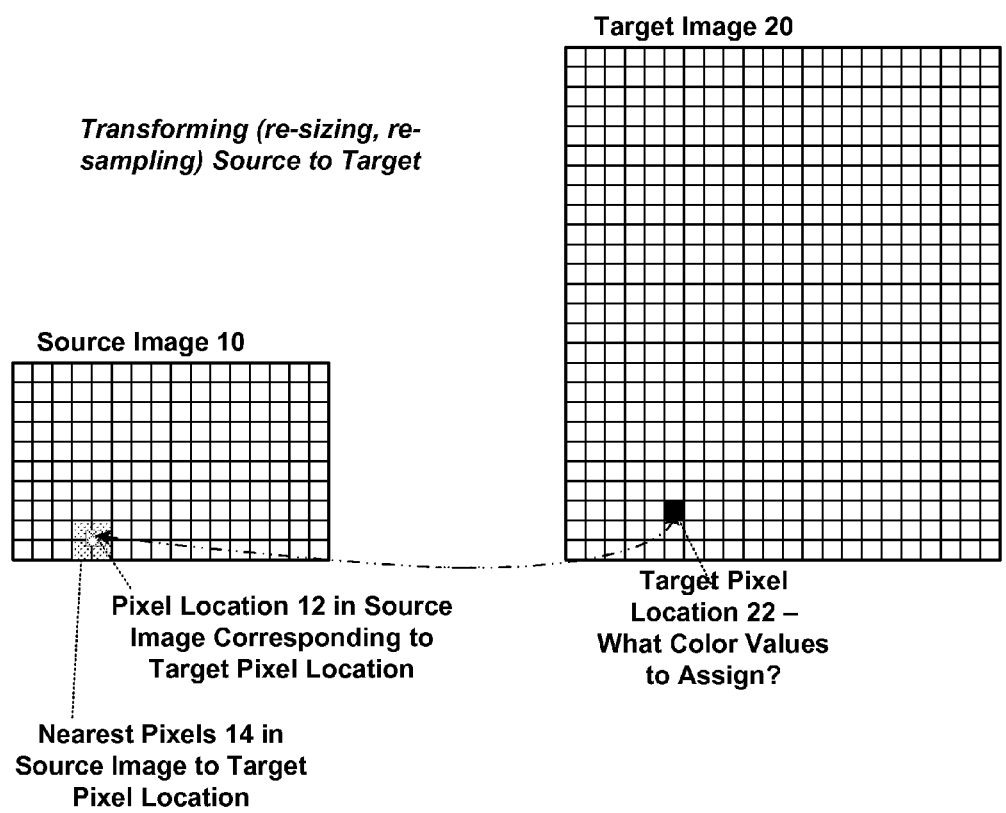
FIG. 1 illustrates a block diagram of an image transform process for determining pixel values in a target image.

In FIG. 1, a source image 10 is to be re-sized to a target image 20 having a greater number of pixels, though for the avoidance of doubt, re-sizing also applies to a target image having a smaller number of pixels, and re-sizing can be independently applied to the vertical or horizontal axes. With such a re-sizing operation, a target pixel location 22 in target image 20 corresponds to pixel location 12 in source image 10, though as noted, pixel location 12 falls between two or more pixels. In this regard, pixel location 12 falls amid nearest pixels 14 in the source image, e.g., the four closest pixels in the source image to where the target pixel location maps.

As mentioned, there are a variety of conventional algorithms that can be used to compute a destination pixel or texel value where the destination pixel or texel location maps back to somewhere between pixels or texels in a source image. Each of the conventional algorithms has performance tradeoffs, which make them desirable under different circumstances. Oversimplifying some at the outset, some algorithms are relatively simple and fast, but work well only under certain circumstances, otherwise they can introduce artifacts, such as blockiness, into resulting images. Other algorithms are more complex and slower as a result, but work well under more general circumstances, even where color values change rapidly and/or unexpectedly over a source image. Other algorithms represent various performance tradeoffs between the extremes.

Accordingly, in various embodiments described below, adaptive filtering techniques are provided that enable a hybrid of performance tradeoffs to be achieved when transforming an image based on dynamic conditions associated with pixels being transformed. In one embodiment, a heuristic referred to as a color similarity value is introduced to drive which algorithm applies to determine the target pixel value for the target image. Based on the color similarity value(s) determined from pixel(s) from the source image corresponding to a target pixel in the target image, an appropriate interpolation technique is applied. For instance, in one non-limiting embodiment, nearest neighbor interpolation is performed if the color similarity value(s) indicates high color similarity among the pixel(s) in the source image, and bi-linear or bi-cubic interpolation is performed if the color similarity value(s) represent highly dissimilar colors of source pixel(s).

Adaptive Filtering for Image Transform Processes

In general, to maintain good quality with video, the results should be filtered as they are scaled to fit the desired target. Unfortunately, algorithms with the highest performance characteristics, which are capable of addressing rapidly changing image data in the source image when transforming the image data, e.g., bi-linear interpolation, bi-cubic interpolation, etc., are fairly CPU intensive. Accordingly, blind application of such algorithms is often "overdoing it" for many pixel transforms where a simpler, faster algorithm performs the same, better or nearly as well. While "overdoing complexity to achieve a more optimal result" is acceptable when time or cost (considering any increased hardware requirements) are not limitations, real-time rendering of re-sized video may not be able to afford the luxury of employing expensive interpolation algorithms for every pixel transform process encountered for every source image of an entire video sequence.

In this regard, the reality of most video sequences is that the probability of high variation of color values over any given small locus of pixels in any source image of the video sequence is low. This is another way of saying that most areas in video images can be characterized by smooth color transitions or fading, e.g., as one might find on a surface of a wall, desk, window, face, shirt, etc. where the same or similar color is expected across the surface. In contrast, as a matter of overall percentage of the image, very little of an image typically involves color variation of any significant degree to the human eye, e.g., usually less than about 5-20% of image transform processes implicated when transforming a source image to a target image can benefit from a computationally intensive interpolation. The range of 5-20% is not a fixed range, and the actual percentage of pixels that can benefit from computationally intensive interpolation depends on the image data itself, but the sample range is used here to illustrate the low number of image transform processes that benefit from a high quality interpolation algorithm. Again, this is due to the observation that much of an image is smooth.

This leads to the observation, manifested in various embodiments described herein, that even a bad guess in the neighborhood of the color of the original surface, if performed very quickly, can perform well for about 80-95% of the image transform processes while one or more higher quality algorithms can be reserved for the 5-20% of operations that will benefit. Accordingly, in one embodiment, a similarity metric is determined based on a set of pixels in the source image that relate to the target pixel location in the target image of an image transform process.

Thus, in various non-limiting embodiments, adaptive image transform techniques are provided for resampling pixel or texel data from a source image to corresponding locations in a target image.

Figure 2:
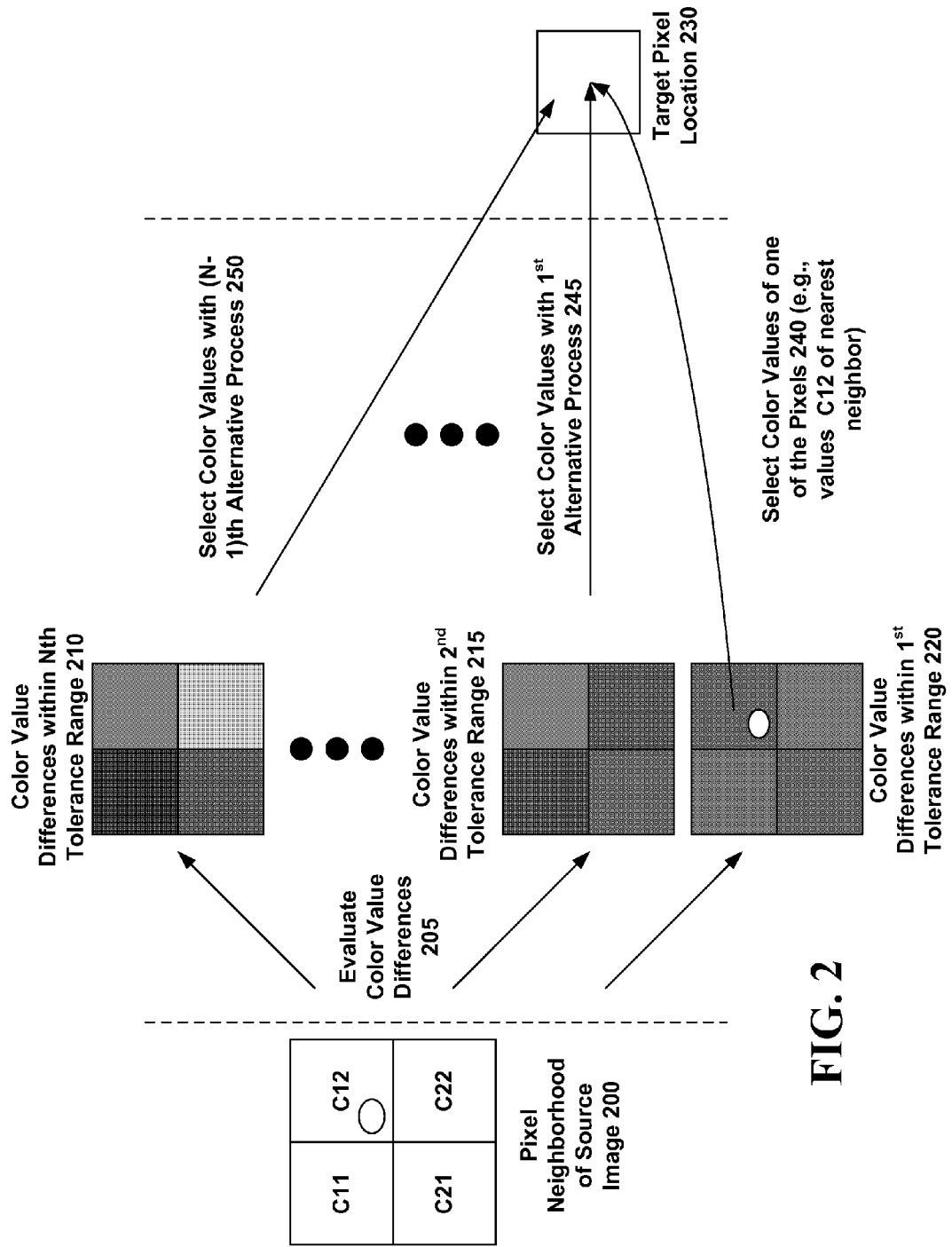
FIG. 2 is a block diagram illustrating a general process for selecting a pixel transform algorithm based on color value differences of pixels in a source image.

In one embodiment, an algorithm is provided that determines, on a pixel by pixel basis, if any benefit would occur from one or more advanced algorithms and, if not, opts for a cheaper, less complex and/or faster algorithm that produces as good or at least similar results. FIG. 2 illustrates this general embodiment in which, for each pixel 230 of a target image to be generated from transforming a source image in some fashion, an evaluation of source pixel(s) 200 of the source image that map to the pixel 230 first occurs. This evaluation determines "how close in color" the pixels of pixel neighborhood 200 are. Thus, as shown, the four closest pixels to where pixel location 230 maps in the source image are selected, having color values C11, C12, C21 and C22, respectively. Thus, depending on a function that evaluates the color value differences at 205, an algorithm is then adaptively selected to use an algorithm of appropriate complexity.

In one non-limiting implementation, for instance, a point is first interpolated between C11-C21 and C12-C22 and then a color comparison is performed at that point to determine the color similarity in neighborhood 200. In practice, such implementation is advantageous because it produces a result that is still usable for bilinear interpolation if the colors are regarded to be substantially dissimilar in neighborhood 200. Even if bilinear interpolation is not needed for acceptable results, the interpolation between C11-C21 and C12-C22 can still be output to several pixels for a scale up operation.

For instance, if the color value differences are within a first tolerance range as depicted for arbitrary colors (grey scale is actually depicted, but one of ordinary skill in the art can appreciate that any arbitrary colors according to any arbitrary color model can be used), i.e., if the pixel neighborhood 200 includes pixels of sufficiently similar colors, then a simple algorithm for sampling from the source image can be selected to form a value for target pixel location 230. For instance, an algorithm can be adopted in such circumstances, which is any of the color values C11, C12, C21 or C22 since they are all of similar color. The threshold for being within the $1^{st}$ tolerance range 220 can be set heuristically or by setting within a color deviation detection threshold dictated by the average capabilities of the human eye.

Similarly, if the color value differences of the pixel neighborhood 200 dictate color similarity according to a second tolerance range 215, e.g., the source pixels 200 are somewhat similar, but also somewhat dissimilar, then color values are determined for target pixel location 230 based on a $1^{st}$ alternative process 235, e.g., bilinear interpolation.

The same can be applied to N tolerance ranges, such that if the color value differences of the pixel neighborhood 200 dictate a color similarity according to the $N^{th}$ tolerance range 210, e.g., the colors of source pixels 200 are highly dissimilar, then $(N-1)^{th}$ alternative process 250 can be used, e.g., bi-cubic interpolation. In this regard, the color similarity metric evaluated at 205 enables a quick determination of how complex a resulting interpolation process need be. Oftentimes, no harm, or undetectable harm, results in the target image from performing algorithm 240, in which case performance is significantly enhanced by the adaptive filtering techniques described herein.

Figure 3:
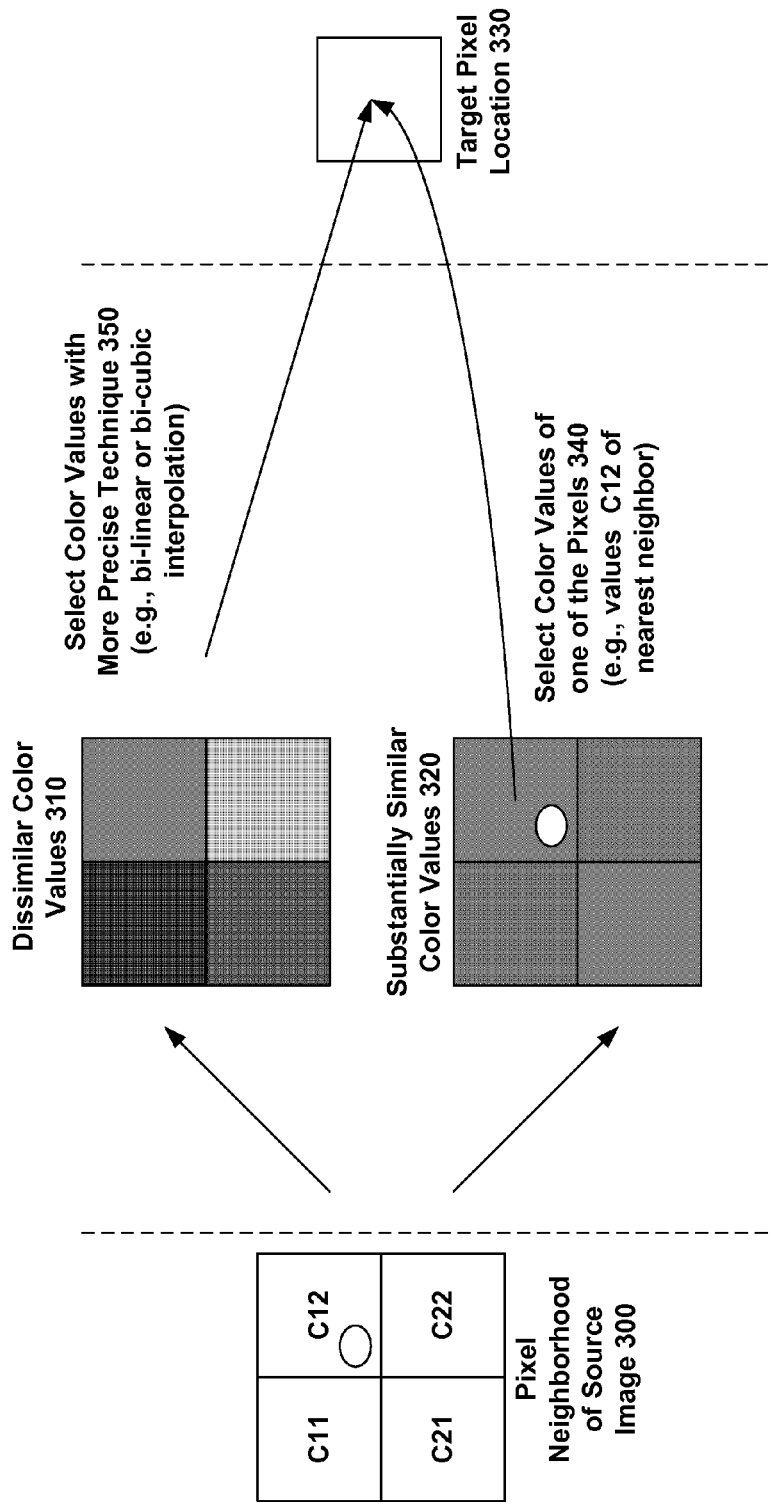

FIG. 3 is a block diagram illustrating an embodiment of adaptive filtering that employs a threshold color similarity evaluation for determining how to interpolate from pixel neighborhood 300 of the source image to a value for target pixel location 330. In this regard, if colors C11, C12, C21 and C22 are of threshold color similarity as is the case for color values 320, then, simple algorithm 340 is selected that selects, for instance, the nearest neighbor. The nearest neighbor in the drawing is the source pixel in the upper right quadrant of pixel neighborhood 300, and thus target pixel location 330 is assigned value C12. If however, colors C11, C12, C21 and C22 are not of threshold similarity to one another as depicted by color values 310, then a more precise interpolation technique 350 can be adopted to perform the interpolation, e.g., using bi-linear interpolation.

Figure 4:
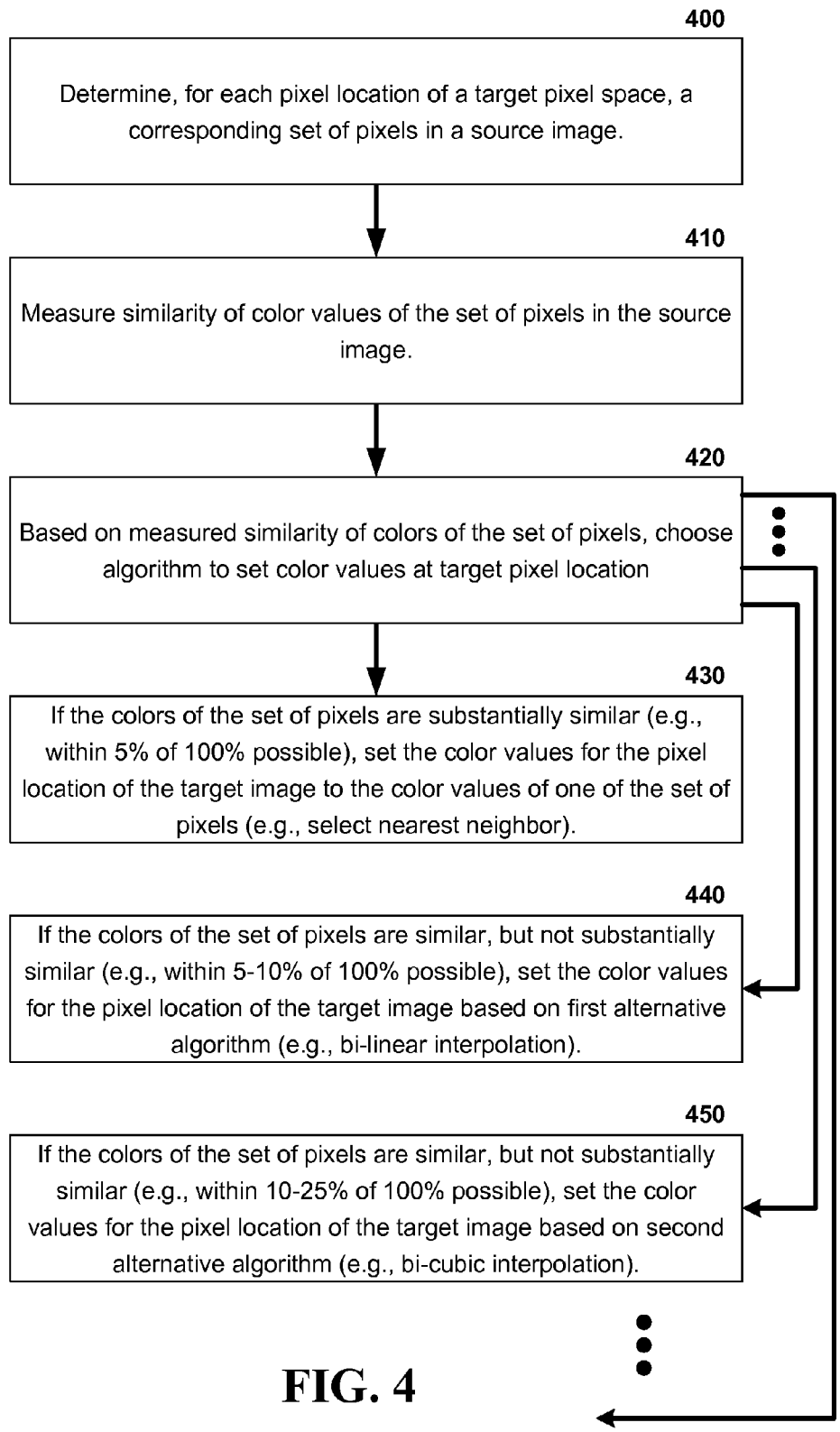
FIG. 4 is a flow diagram illustrating a general set of acts in a computing system for selecting a pixel transform algorithm based on color value differences of pixels in a source image.

FIG. 4 is a flow diagram illustrating a general process for carrying out adaptive filtering according to embodiments described herein. At 400, for each pixel location of a target pixel space, a corresponding set of pixels in a source image is identified. At 410, the similarity of color values of the set of pixels in the source image is measured. At 420, based on the measured similarity of colors of the set of pixels, an algorithm is selected or chosen that will set the color values at the target pixel location. Then, as represented by steps 430, 440, 450, and beyond, any number of different algorithms can be selected to perform the interpolation for the value of the target pixel depending upon a color similarity range in which the color similarity determined at 410 falls.

For instance, while there are numerous ways of computing a "color similarity," one way is to observe, over a maximum disparity (say 100% disparity where two colors are at opposite ends of the color spectrum) what the percent of disparity is. Thus, in one embodiment, at 430, if the colors of the set of pixels from the source image are substantially similar, e.g., within 0% to 5% color disparity, then the color values for the pixel location of the target image are set to the color values of one of the set of pixels according to the nearest neighbor technique. Then, while many different specific ranges and values can be selected for a given application, another algorithm, e.g., bi-linear interpolation, can be selected to handle the situation when the colors of the set of source pixels indicate a color disparity of from about 5-10%. Similarly, if the colors of the set of source pixels indicate a color disparity of from about 10-25%, then yet another algorithm, e.g., bi-cubic, can be applied at 450, and so on for as many or as few ranges or disparity tolerances that a designer defines.

Figure 5:
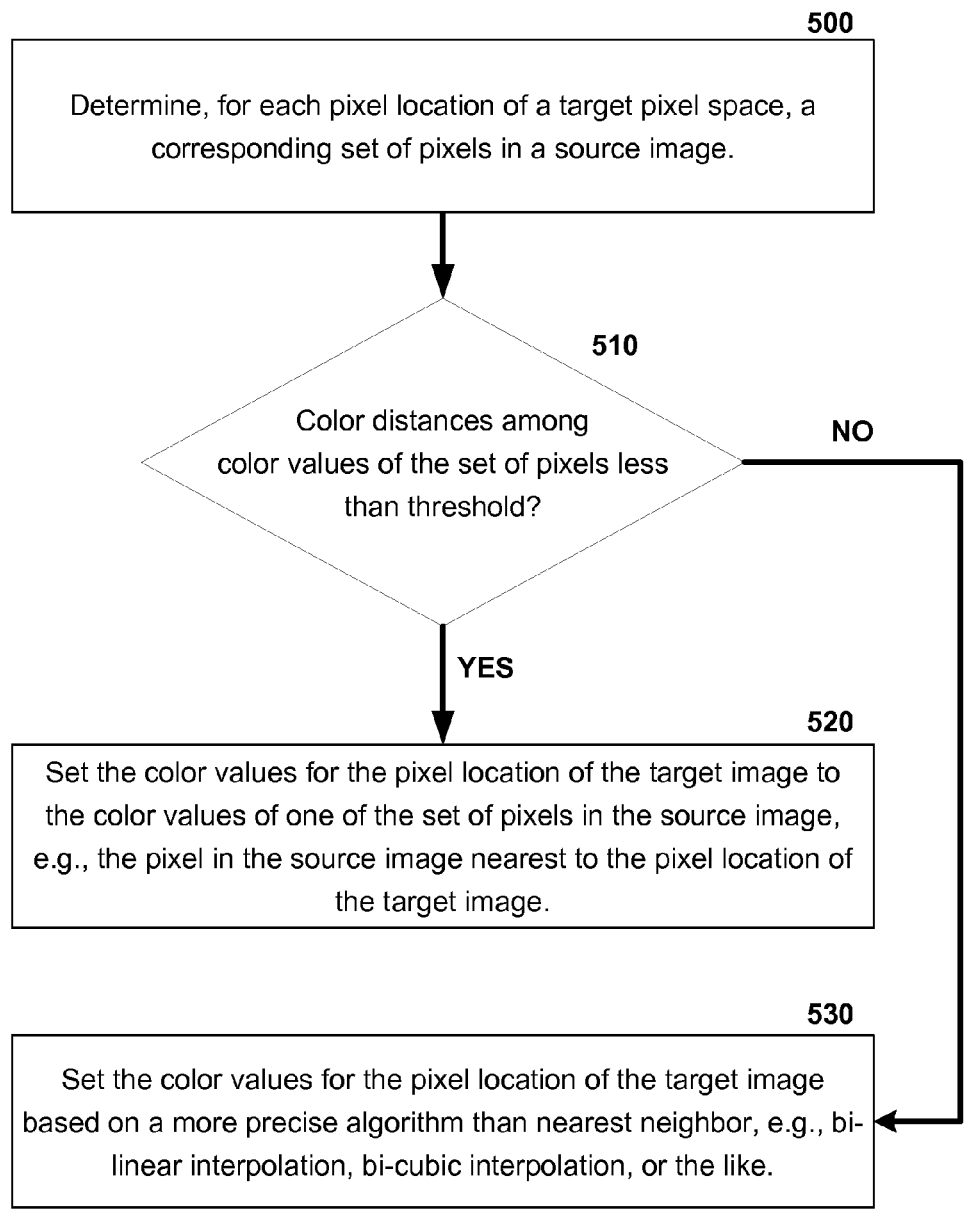

FIG. 5 illustrates a non-limiting embodiment in which the presence of a threshold color similarity is determined, and which dictates whether a simple or more complex interpolation technique is employed. As shown, at 500, for each pixel location of a target pixel space, a corresponding set of pixels in a source image is determined. At 510, if the computed color distances among the color values of the set of pixels do not exceed (or are less than) a threshold distance, then at 520, a nearest neighbor interpolation is employed. If not, then at 530, the color values for the pixel location are determined by a higher quality algorithm, such as bi-linear interpolation, bi-cubic interpolations, or the like.

For instance, when transferring an image to a screen involving a re-sizing transform, the net effect of applying the faster algorithm, where complexity is not required, is dramatically reduced time spent transferring the image to the screen. Accordingly, a substantially better experience for rendering video data in real-time, either from disk or from a streaming network source, is provided because effects from computational bottleneck in the rendering pipeline are mitigated. This can have even more benefit where mainly software rendering techniques are employed without the benefit of today's specialized hardware. It should be noted, however, that the various embodiments described herein realize performance gains for hardware implementations as well.

By one observation, according to tests run for sample images from various media streams, an implementation of the adaptive filtering algorithm was shown to be 35% to 50% less expensive per pixel on average than existing state of the art implementations, including implementations of bi-linear and bi-cubic interpolation.

Figure 6:
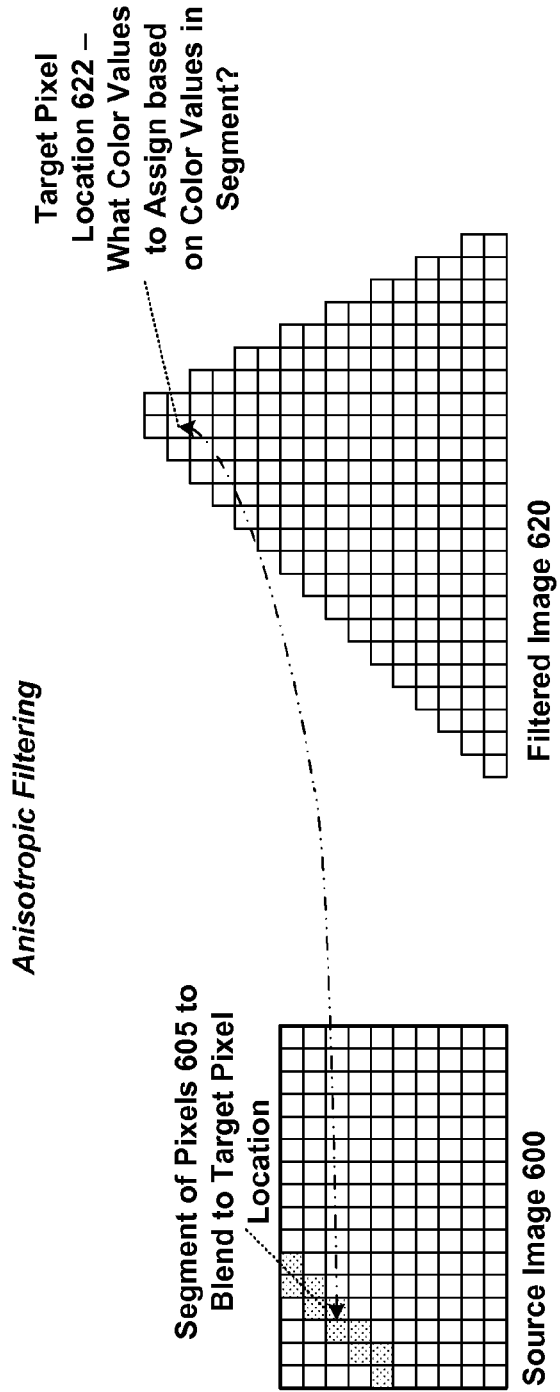
FIG. 6 illustrates a block diagram of an anisotropic filtering process for determining pixel values in a target image transform.

FIG. 6 illustrates another graphics image transform process called anisotropic filtering that helps a target image retain the sharpness of an object as the object recedes into the background, or comes into the foreground, as part of a perspective change for the object. A filtered image 620 is formed to represent the image data as re-sampled for the perspective change. In this regard, similar to the above-described embodiments, the color values of each target pixel location of the filtered image 620, such as target pixel location 622, are determined from samples of the source object or image 600. In general, a segment of pixels 605 winds up corresponding to target pixel locations, such as target pixel location 622. In such case, the segment of pixels 605 of source image 600 are blended to form the value for target pixel location 622. Blending many pixels can be an expensive operation.

Figure 7:
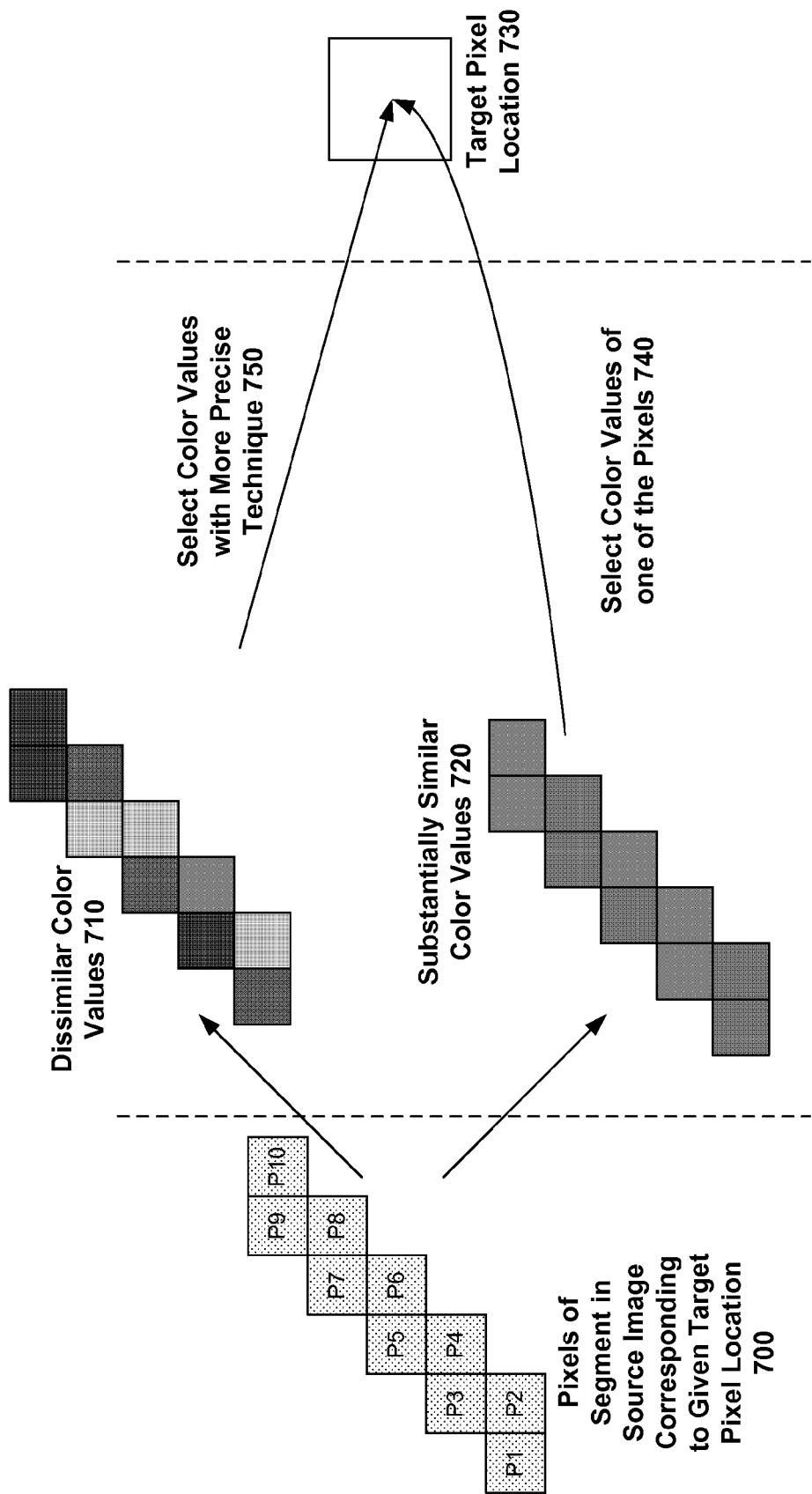

As illustrated in FIG. 7, however, if the pixels of such a segment 700 contain colors that are substantially similar, e.g., as depicted for color values 720 showing sample similar colors for pixels P1, P2, P3, P4, P5, P6, P7, P8, P9, P10, then a nearest neighbor approach 740 can be adopted in which the closest pixel, e.g., P8, determines the color values of target pixel location 730. In the situation where the colors of the segment are substantially dissimilar, e.g., as shown by sample color values 710, then the more precise blending technique 750 can take all of the color values for pixels P1, P2, P3, P4, P5, P6, P7, P8, P9, and P10 into account.

Figure 8:
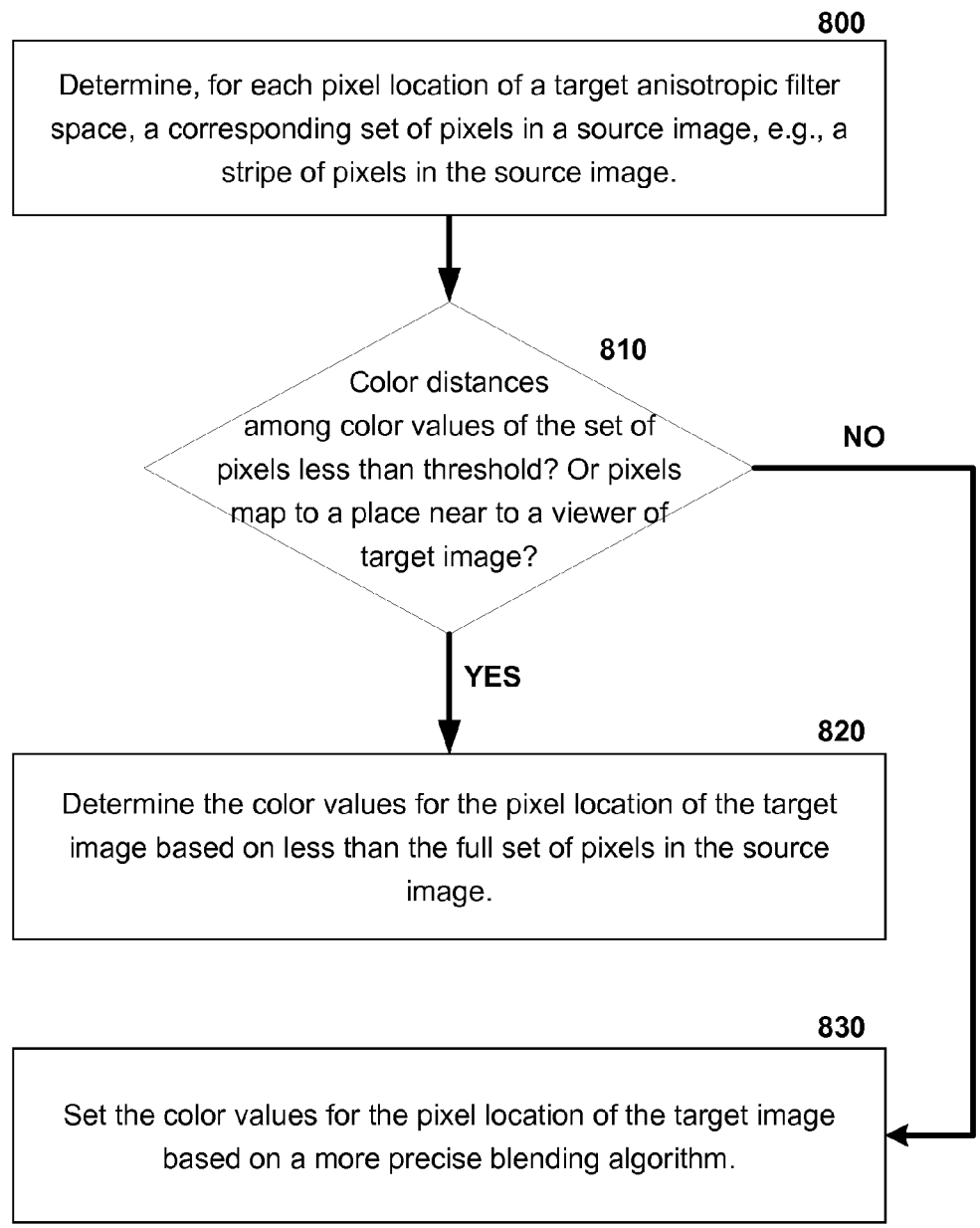

The above-described methodology for adaptive anisotropic filtering is represented in the flow diagram of FIG. 8. At 800, for each pixel location of a target pixel space, a corresponding set of pixels, e.g., a segment of pixels along a perspective line, in a source image is determined. At 810, if the computed color distances among the color values of the set of pixels do not exceed (or are less than) a threshold distance, then at 820, a simple blending operation is employed for the set of pixels. If not, then at 830, the color values for the pixel location are determined by a higher quality algorithm, such as an algorithm that performs a weighted blend of all of the set of pixels.

A non-limiting example of a lower complexity operation that can be predicated on high color similarity is one that inputs fewer samples along the perspective line as part of forming the output. Thus, where the colors along the perspective line are highly similar, a smaller number of samples can be used for producing the corresponding color values at the target location in the target image. Conversely, where the segment of pixels along the perspective line exhibits a higher degree of color variation, a higher number of samples can be used as input, with the highest degree of variation using all samples as part of the blending operation to produce the target pixel value.

Another alternative or supplemental technique for determining how many of the samples along the segment are acceptable for computing color values of a pixel in a target image is to determine how far the pixel location in the target image is from a viewer of the target image. Where the pixel location in the target image is relatively far from the viewer of the target image, typically, a greater number of source samples are needed to generate a quality result. In contrast, where the pixel location in the target image is relatively close to the viewer of the target image, typically, fewer source samples are needed to produce acceptable quality.

Figure 9:
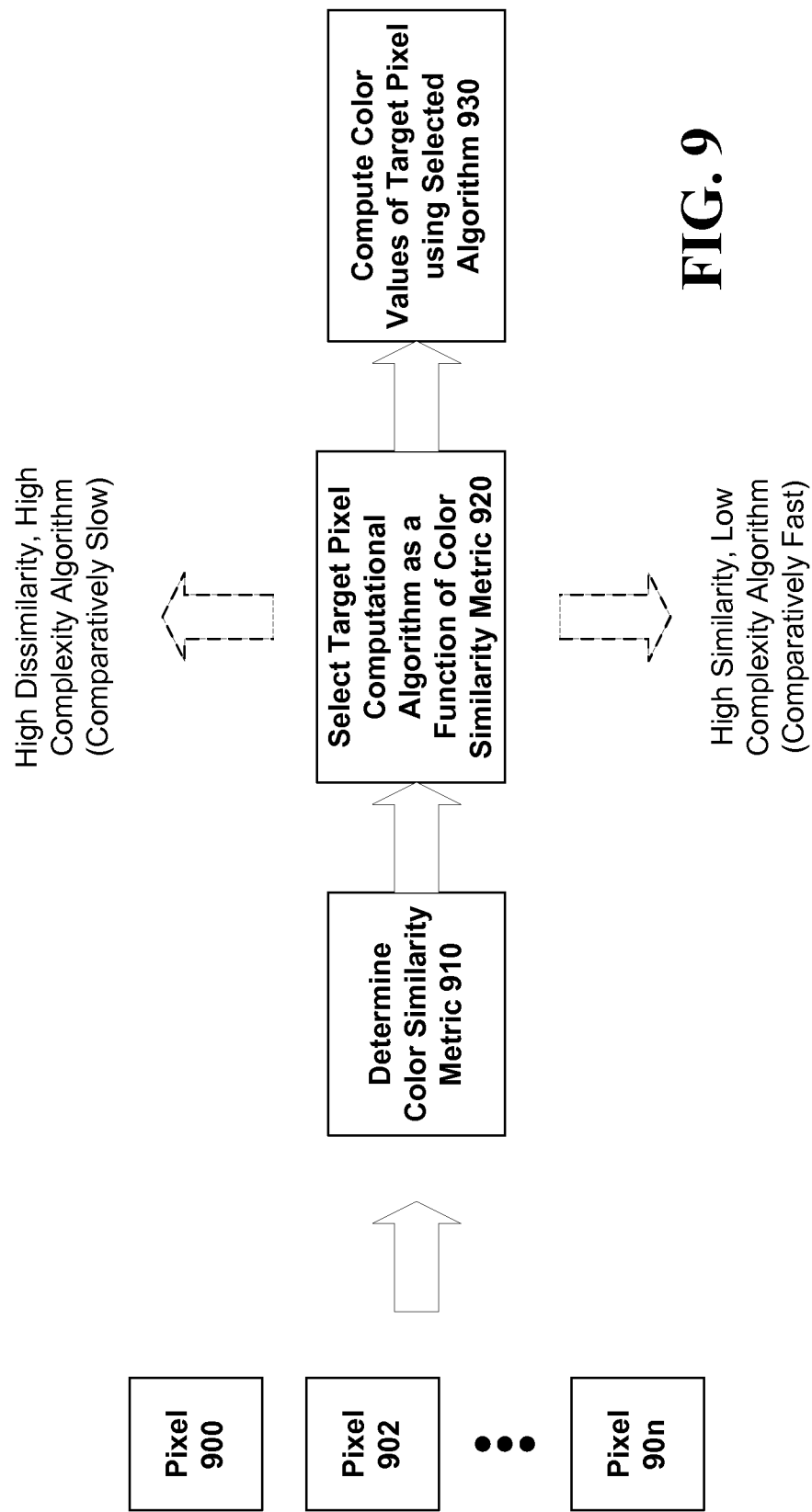
FIG. 9 is a block diagram illustrating an aspect of optimization of performance tradeoffs among various techniques for transforming an image according to various embodiments described herein.

FIG. 9 is a block diagram illustrating the general applicability of the various embodiments described herein in that the techniques can be applied for any color dependent image transform that transforms, or re-samples, a set of pixels 900, 902, . . . , 90n in a source image to generate target samples of a target image space. In this regard, since the human eye does not detect minor variation in color well, especially at the rate that video renders image, a simple color similarity metric 910 can be employed to dictate which algorithm is selected at 920 for the transform for that target pixel. Such algorithm selected at 920 and carried out to compute the color values of the target pixel at 930 can have a low complexity, comparatively fast algorithm for handling highly similar color content, since any error is unlikely to be noticed in such circumstances. Moreover, for every grade of color dissimilarity, other more complex, but comparatively slower, algorithm(s) can be selected. Since most small areas of pixels in an image tend to have similar color content, an embodiment that defaults to a nearest neighbor approach unless more precision is desired can be an effective implementation for any complex image transform operations that are dependent on the color values of the pixels of the source image.

Figure 10:
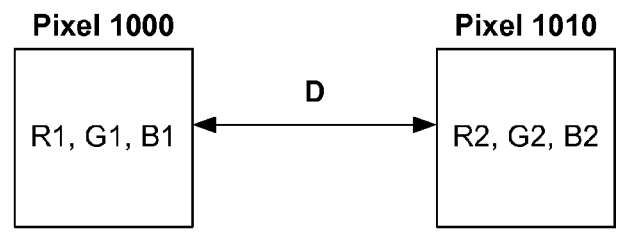
FIG. 10 is a block diagram illustrating a non-limiting way to determine color distance between two pixels.
Figure 10:
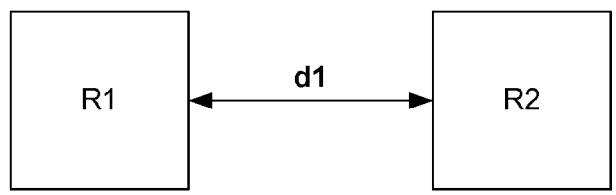
Figure 10:
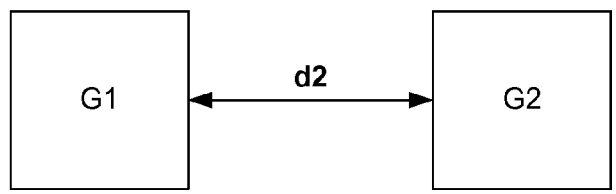
Figure 10:
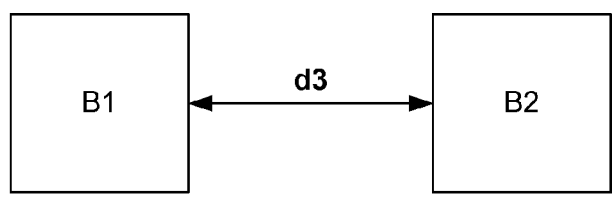
Figure 11:
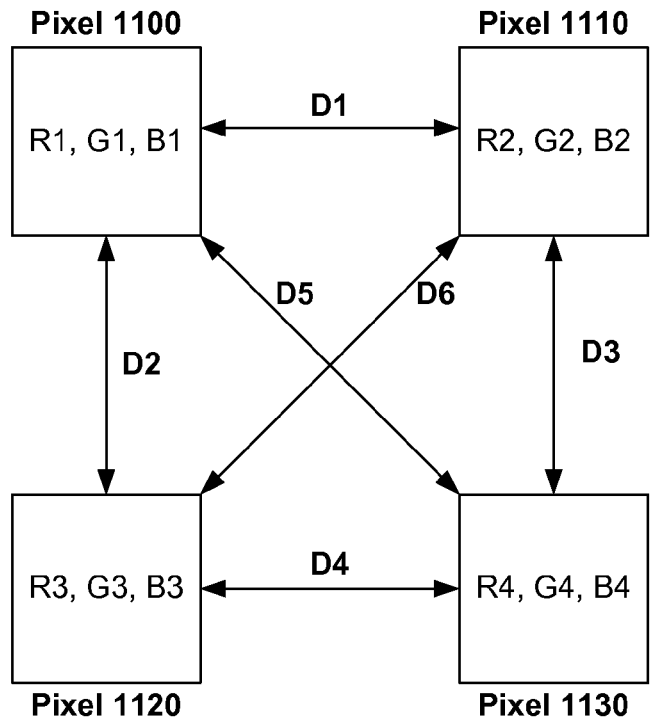
FIG. 11 is a block diagram illustrating various non-limiting ways to compute a color similarity metric based on color distances among a group of pixels.

FIGS. 10 and 11 are block diagrams illustrating non-limiting ways to determine color distances between two pixels. For instance, in FIG. 10, two pixels 1000, 1010 have color values in the red, green, blue (RGB) color space of R1, G1, B1 and R2, G2, B2, respectively. One way to compute color distance D between pixel 1000 and pixel 1010 is to compute the individual component wise distances d1 representing distance for the red component, d2 representing distance for the green component and d3 representing distance for the blue component. Then, D can be taken as any reasonable function of d1, d2 and d3. For instance, D could be defined as the square root of $(d1^2+d2^2+d3^2)$ or simply as d1+d2+d3, i.e., any metric that tends to increase or decrease as colors become more or less similar.

In contrast to the RGB color space, a color space such as the YUV color space is predicated on luminescence, and thus, strictly speaking distance calculations can be carefully specified based on the limitations of the human eye. Where time exists, or where a process can otherwise precede any of the above-described embodiments, source image data can be converted to a color model based on the non-linear characteristics of the human eye. However, as a practical matter, color distances in the RGB color space are also meaningful to the human eye, and thus a threshold difference of about 5-10% of difference has been found effective in the RGB color space.

FIG. 11 further illustrates that, even after defining a function for determining color distance between two pixels, defining color similarity for a set of pixels 1100, 1110, 1120, 1130 (or any arbitrary number) involves additional choices in designing a metric. For instance, where there are four pixels, 6 comparisons or 6 distances D1, D2, D3, D4, D5 and D6 can be determined as shown. The number of distance calculations grows with each pixel added to the set of pixels.

One way to determine a single score for color similarity among the set of pixels is to determine any function 1140 that is a function of D1, D2, D3, D4, D5 and D6. For instance, function 1140 might determine whether any of D1, D2, D3, D4, D5 and D6 exceed a pre-defined threshold. Another way is to examine the nearest neighbor pixel in the source image that maps to the destination or target pixel. In FIG. 11, presume that pixel is pixel 1100. Then, a faster algorithm could examine the distances only from the nearest neighbor pixel 1100, namely, only D1, D2 and D5 are computed and compared to a pre-defined threshold. Thus, one can see that a host of alternatives exist to form a color similarity metric that determines how similar a locus of pixels in the source image are in terms of color.

Figure 12:
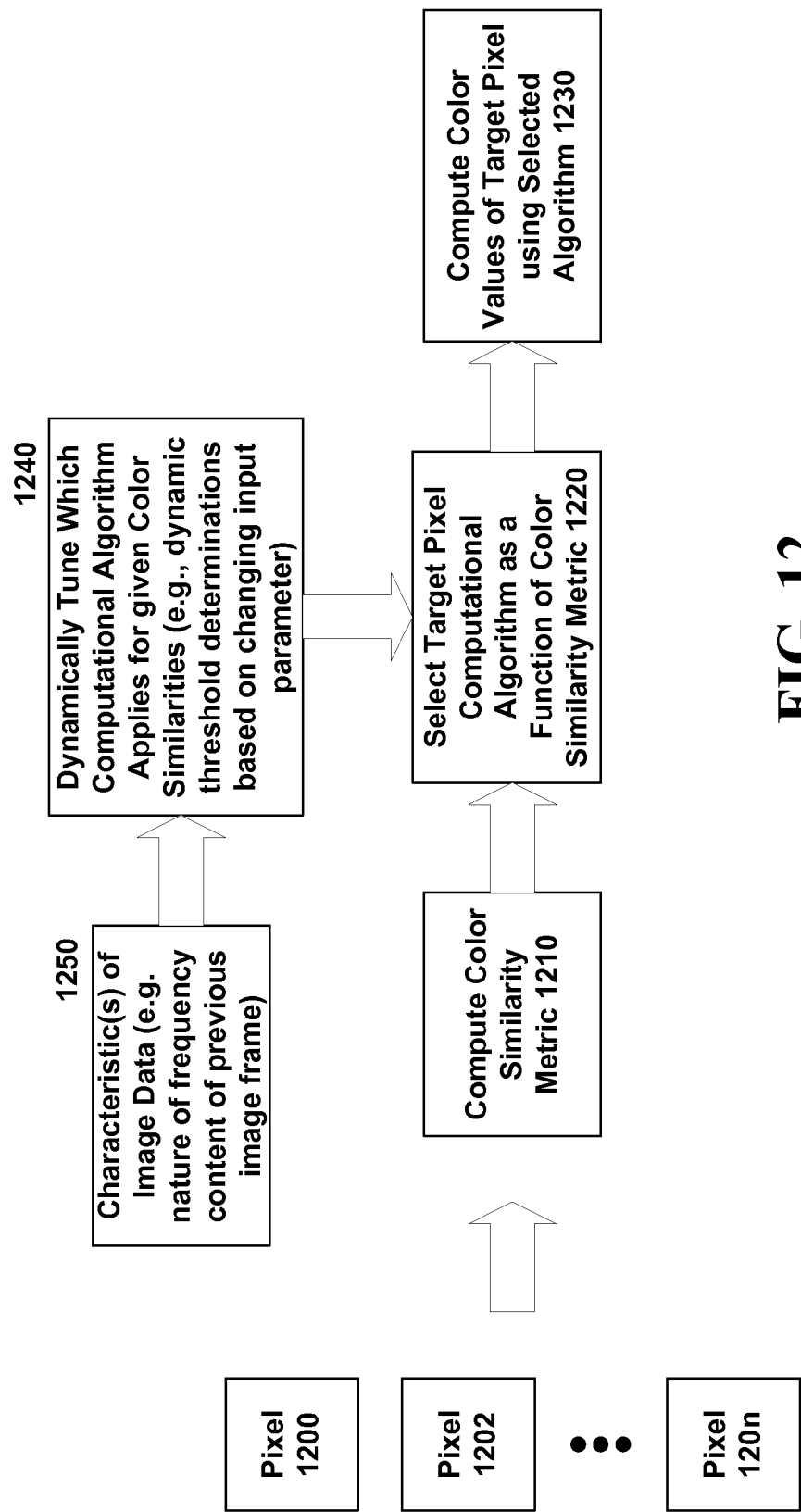
FIG. 12 is a block diagram illustrating an embodiment in which one or more threshold color similarities, used to determine what target pixel value computational algorithm is selected, change in real-time based on dynamic image characteristic(s)

FIG. 12 illustrates a block diagram showing an optional feature for incorporation into any of the embodiments described herein. As mentioned, at 1210, a color similarity metric 1210 is computed based on pixels 1200, 1202, . . . , 120n in a source image. At 1220, the target pixel computational algorithm is selected as a function of the color similarity metric 1210 according to some pre-defined ranges or threshold values. Then, the algorithm is employed at 1230 to interpolate color values for the target pixel. At the same time, on an image to image level being rendered as part of a video sequence, some data pertaining to one or more past or recent image(s) can be maintained. Due to the temporal as well as spatial tendency of pixel color values to stay smooth across and within images, temporal information can inform the selection of the ranges or thresholds that decide which algorithms apply to which color similarity values for a given set of pixels.

For instance, suppose a rendering system knows, having processed the most recent image, that the more complex algorithm was selected only once for the most recent image (e.g., maintain a simple counter), and also known that the real-time video rendering requirements can support thousands of performances of the more complex algorithm in every frame. Then, the threshold for reaching the more complex algorithm in terms of color similarity can be dynamically lowered for the current frame achieving higher quality without taking a performance hit, because the current frame is also likely to have highly similar color content too. Thus, generally speaking, some known characteristic(s) 1250 of the image data being transformed (e.g., some knowledge of the frequency content of previous image frames) can be input to a tuning component 1240 that dynamically tunes which computational algorithm should apply based on available processing bandwidth and real-time demands. In this respect, by shifting thresholds, the quality of an image transform can be dynamically tuned according to desired tradeoffs.

As another non-limiting embodiment, where key frames are present (versus incremental frames) in the video, information about how much a given frame will change is already available in the encoding, and thus at least some of this information can be extracted as the video is decoded and used in connection with dynamically tuning one or more color similarity threshold(s) to achieve an optimal tradeoff.
Supplemental Context Relating to Alternative Filtering Algorithms for Use with Adaptive Filtering Techniques For further supplemental context regarding alternative adaptive filtering implementations that fall back to one or more complex algorithms from a simple algorithm where a benefit can be obtained from the one or more complex algorithms, the following description generally describes some alternatives for the one or more complex algorithms. By way of general background, a bitmap is said to be sampled on each pixel, rather than being supersampled (more than one point of data per pixel) or subsampled (less than one point of data per pixel). Resampling this bitmap involves creating a sample grid, which is overlaid on the pixels. According to how far each grid point is away from the original center of each pixel, and according to whatever resampling algorithm is in use, the new sample point is given a color value.

The mathematics behind bitmap resampling is multivariate interpolation in two spatial variables, and performed separately for each color channel, which outlines the methods available to bitmap resampling. The simplest multivariate method is known as nearest neighbor or point sampling. The closest pixel center to each sample grid point is used, with no input from other surrounding pixels. Nearest neighbor interpolation is thus a simple method of multivariate interpolation in 1 or more dimensions.

Interpolation is the problem of approximating the value for a non-given point in some space, when given some values of points around that point. The nearest neighbor algorithm simply selects the value of the nearest point, and does not consider the values of other neighboring points at all, yielding a piecewise-constant interpolant.

Due to its simplicity, the nearest neighbor approach, sometimes used in conjunction with mipmapping, can be effective for certain kinds of applications, but not as effective for others. In contrast to the more complex algorithms described below, the nearest neighbor approach is comparably fast, though introduces noticeable image artifacts, particularly in areas of an image being resized that has high levels of color variation (e.g., generally corresponding to high frequency content).

In sum, with the nearest neighbor approach, essentially the new bitmap grid is overlaid over the original grid and the values of whichever original pixel's co-ordinates is closest to the new target pixel's co-ordinates are used. As well as being a simple system in terms of processing, the nearest neighbor approach has the immediate advantage that the colors used in the image are unchanged, which can be beneficial when dealing with indexed graphics interchange file (GIF) images where the palette of colors is already limited and fixed.

As a downside of the nearest neighbor approach, the co-ordinates of each output pixel are unlikely to overlay an original directly and, within each image, some pixels will be a closer match than others. In addition, many original pixels are likely to be discarded in the target image while others may be used more than once. For instance, this might happen where an image transform involves a rotation of the source image. The arbitrary nature of pixel value selection, while leading to a fast choice, leads to "break up" of image features, especially angled lines and other sharp color contrast features, which results in "stair stepping," "jaggies" and/or other industry terms for distortion or error in an image.

As mentioned, most of the time, when drawing a textured shape on screen or re-sizing an image during rendering, the texture or source image, respectively, is not displayed exactly as it is stored, without any distortion, i.e., most pixels map back to a point on the texture or source image that is between two or more texels or pixels, respectively. In this regard, as an alternative to nearest neighbor techniques, bilinear filtering uses these points to perform bilinear interpolation between the four texels or four pixels nearest to the point that the pixel represents. Bilinear filtering is a texture filtering method used to smooth textures when displayed as being larger or smaller than they actually are in any dimension.

Bilinear filtering is rather accurate until the scaling of the texture scales to a point below half or above double the original size of the texture—that is, if the texture was 256 pixels in each direction, scaling it to below 128 or above 512 pixels can produce a poor result, because of missing pixels or too much smoothness. Often, mipmapping is used to provide a scaled-down version of the texture for better performance and better image quality in the scaled down mipmap levels; however, the transition between two differently sized mipmaps on a texture in perspective using bilinear filtering can be abrupt. Moreover, mipmaps themselves are computationally expensive to build, potentially affecting real-time transform requirements of a video application or service.

Trilinear filtering, though somewhat more complex and expensive to perform, can make this transition smoother throughout. In this regard, expense can manifest itself as cost for more expensive hardware to perform a fixed set of instructions faster, or expense can also manifest itself as an increase in number of instructions of an algorithm that must be performed on average, and thus an increase in the amount of time it takes to carry out the algorithm. Trilinear filtering is thus an extension of the bilinear texture filtering method, which also performs linear interpolation between mipmaps.

Bilinear filtering has several weaknesses that make it an unattractive choice in many cases: using it on a full-detail texture when scaling to a very small size causes accuracy problems from missed texels, and compensating for this by using multiple mipmaps throughout the polygon leads to abrupt changes in blurriness, which is most pronounced in polygons that are steeply angled relative to the camera. To solve this problem, trilinear filtering interpolates between the results of bilinear filtering on the two mipmaps nearest to the detail required for the polygon at the pixel, though again the additional expense of trilinear filtering is noted.

Trilinear filtering also is sub-optimal, because the pixel is still assumed to take up a square area on the texture. In particular, when a texture is at a steep angle compared to the camera, detail can be lost because the pixel actually takes up a narrow but long trapezoid: in the narrow direction, the pixel is getting information from more texels than it actually covers, so details are smeared, and in the long direction the pixel is getting information from fewer texels than it actually covers, so details fall between pixels. To alleviate this, anisotropic, or direction dependent, filtering can be used.

In computer graphics, anisotropic filtering, sometimes abbreviated AF, is a method of enhancing the image quality of textures on surfaces that are at oblique viewing angles with respect to the camera where the projection of the texture (as opposed to the polygon or other primitive on which the texture is rendered) appears to be non orthogonal. Like bilinear and trilinear filtering, anisotropic filtering eliminates aliasing effects, but introduces less blur at extreme viewing angles and thus preserves more detail. Anisotropic filtering is relatively expensive, usually computationally, though the standard space-time tradeoff rules apply. Anisotropic filtering is now common in modern graphics hardware and enabled either by users through driver settings or by graphics applications and video games through programming interfaces.

In the mathematical subfield numerical analysis, bicubic interpolation is a method to do multivariate interpolation in two dimensions. In this regard, a function of two variables which has known values only at discrete points, can be approximated in between the discrete points using interpolation, and the term "bicubic" refers to that the interpolated surface is continuous everywhere and also continuous in the first derivative in all directions, meaning that the rate of change in the value is continuous.

While even more complex and slower than bilinear interpolation, bicubic interpolation generally performs better from an image quality standpoint. As a result, for many non-real time rendering applications, the bicubic algorithm is frequently used for scaling images and video for display since it is known to generally preserve fine detail, as might be found, for instance, in lace in a veil or a dress, better than the bilinear algorithm.

Lanczos resampling is another multivariate interpolation method used to make digital images larger or smaller by resampling. With Lanczos resampling, the final values are a weighted sum of the original values, based on relative position to the original image, where the weighting is given by the Lanczos weighted sin c function. Lanczos techniques employ a windowed product of normalized sin c functions as a convolution kernel for image resampling.

Spline interpolation is a form of interpolation where the interpolant is a special type of piecewise polynomial called a spline. Spline interpolation is preferred over polynomial interpolation because the interpolation error can be made small even when using low degree polynomials for the spline. Other linear filters are also known: Lanczos, Mitchell, Catmull-Rom and other splines.

In sum, linear resampling methods represent a tradeoff between three artifacts: blur, aliasing, and ringing. Blur is a loss of image sharpness. It can be seen on images up-scaled using bilinear or bicubic interpolation. Aliasing appears as jagged edges (during up-scaling) or moire patterns (during down-scaling). It is present in images up-scaled using all linear methods, but it is most visible with nearest neighbor, bicubic, and bilinear methods.

Ringing, also known as Gibbs phenomenon, appears as halo around edges. It is clearly visible with sin c, Lanczos, and bicubic methods. Some small amount of ringing improves the perceived sharpness of the image, but a high amount of ringing is undesirable. Thus, one can see that different interpolation methods produce very different results and are of variant complexities to implement. As a result, adaptive filtering techniques based on color similarity of source pixels is an effective way to balance the tradeoffs.

Exemplary Networked and Distributed Environments

One of ordinary skill in the art can appreciate that the various embodiments described herein can be implemented in connection with any image data processing system or subsystem of any computer or other client or server device, which can be deployed as part of a computer network, or in a distributed computing environment, and can be connected to any kind of data store. In this regard, the adaptive filtering techniques can pertain to any computer system or environment having any number of memory or storage units, and any number of applications and processes occurring across any number of storage units or volumes, which may be used in connection with transforming image data in accordance with embodiments herein.

Distributed computing provides sharing of computer resources and services by exchange between computing devices and systems. These resources and services include the exchange of information, cache storage and disk storage for objects, such as graphics data. Distributed computing takes advantage of network connectivity, allowing clients to leverage their collective power to benefit the entire enterprise. In this regard, a variety of devices may have applications, objects or resources that can perform any one or more of the image processing embodiments described herein, in whole or in part.

Figure 13:
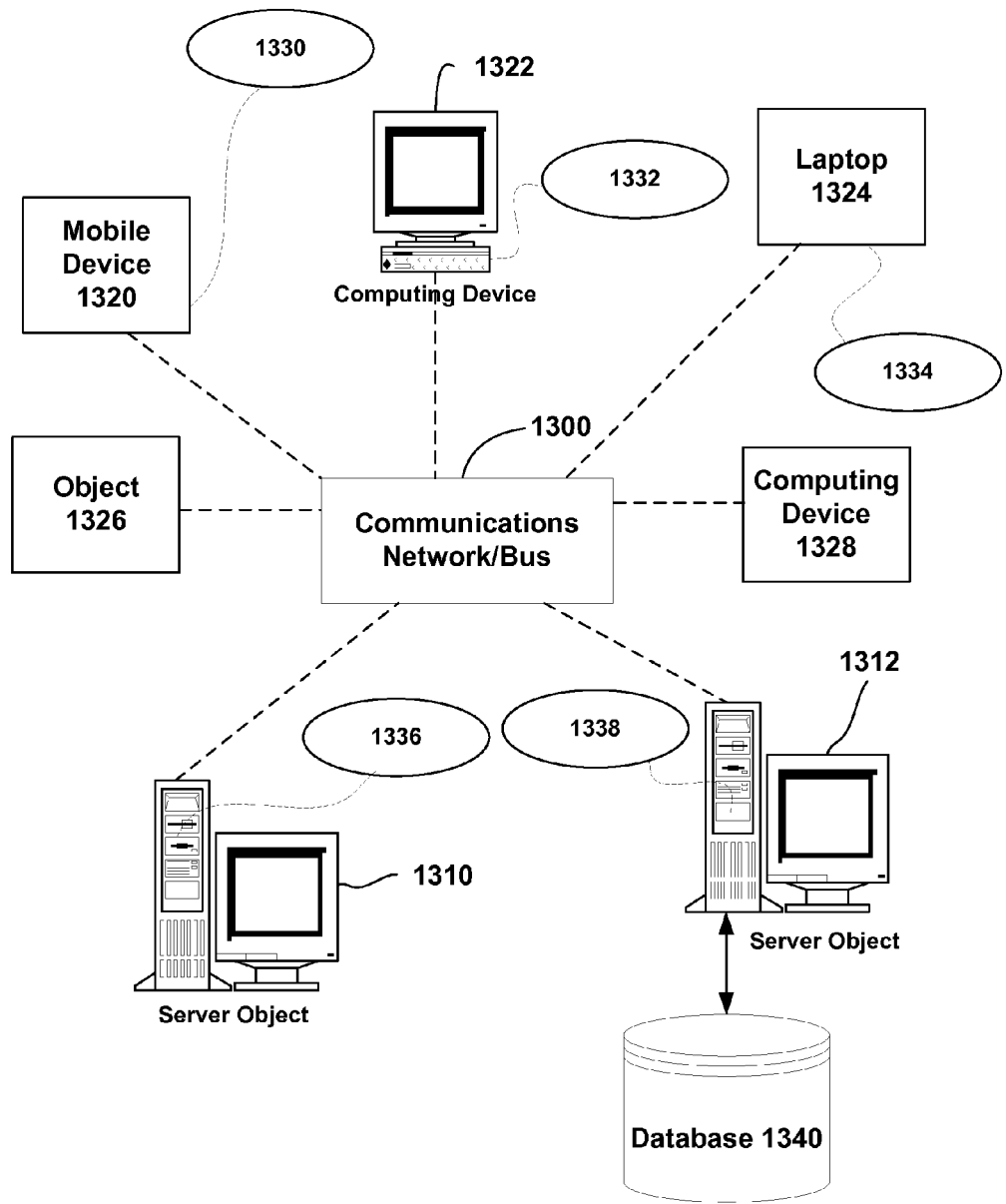
FIG. 13 is a block diagram representing an exemplary non-limiting networked environment in which one or more embodiments may be implemented.

FIG. 13 provides a schematic diagram of an exemplary networked or distributed computing environment. The distributed computing environment comprises server computing objects or devices 1310, 1312, etc. and computing objects or devices 1320, 1322, 1324, 1326, 1328, etc. These objects may comprise programs, methods, data stores, programmable logic, etc. The objects may comprise portions of the same or different devices such as PDAs, audio/video devices, MP3 players, personal computers, mobile phones, etc. Each object can communicate with another object by way of the communications network 1300. Network 1300 may itself comprise other computing objects and computing devices that provide services to the system of FIG. 13, and can also represent multiple interconnected networks. Each object or device 1310, 1312, etc. or 1320, 1322, 1324, 1326, 1328, etc. may contain an application that might make use of an API, or other object, software, firmware and/or hardware, suitable for performing any of the embodiments of image transform processes described herein.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to image transform processes described herein. For instance, in a streaming video application where image data is continuously streamed from a media server to a rendering client device, media rendering hardware at the client and/or a software media rendering client application or service can make use of the adaptive techniques based on color similarity for efficient real-time rendering of the image data.

Thus, network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 13, as an example, computers 1320, 1322, 1324, 1326, 1328, etc. can be thought of as clients and computers 1310, 1312, etc. can be thought of as servers where servers 1310, 1312, etc. maintain the data that is then replicated to client computers 1320, 1322, 1324, 1326, 1328, etc., although any computer can be considered a client, a server, or both, depending on the circumstances. Any of these computing devices may be receiving, transmitting, storing or processing data in connection with an image transform operation performed according to any of the embodiments described herein.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing image transform operations as described herein may thus be distributed across multiple computing devices or objects.

In a network environment in which the communications network/bus 1300 is the Internet, for example, the servers 1310, 1312, etc. can be Web servers with which the clients 1320, 1322, 1324, 1326, 1328, etc. communicate via any of a number of known protocols, such as HTTP. Servers 1310, 1312, etc. may also serve as clients 1320, 1322, 1324, 1326, 1328, etc., as may be characteristic of a distributed computing environment.

Exemplary Computing Device

As mentioned, any device wherein it may be desirable to transform image data can use the adaptive processes set forth herein, e.g., such as when displaying or otherwise determining image data from original image data according to any size or dimensionality other than the size or dimensionality dictated by the original image data. It should be understood, therefore, that handheld, portable and other computing devices and computing objects of all kinds are contemplated for use as well, i.e., anywhere that a device may include graphics processing and/or display capabilities.

Figure 14:
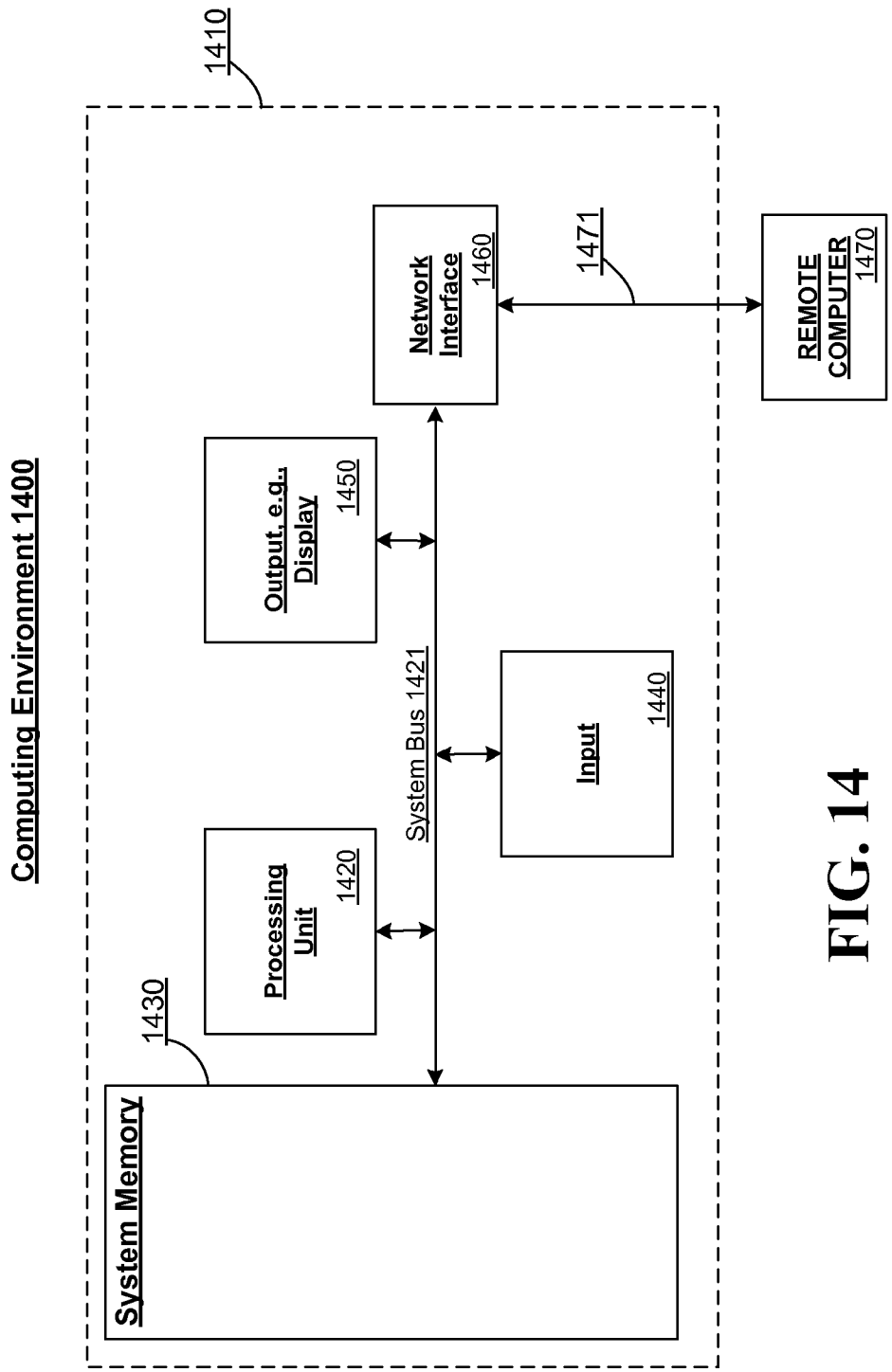
FIG. 14 is a block diagram representing an exemplary non-limiting computing system or operating environment in which aspects of the subject disclosure may be implemented.

Accordingly, the below general purpose remote computer described below in FIG. 14 is but one example, and adaptive filtering processes may be implemented with any standalone device or in connection with a server or client relationship in a network. Although not required, adaptive filtering can partly be implemented via an operating system, for use by a developer of services for a device or object, and/or included within application software. Software may be described in the general context of computer-executable instructions, such as program modules, being executed by one or more computers, such as client workstations, servers or other devices. Those skilled in the art will appreciate that the various alternate embodiments described herein may be practiced with other computer system configurations and protocols.

FIG. 14 thus illustrates an example of a suitable computing system implementation environment 1400, although as made clear above, the computing system environment 1400 is only one example of a suitable computing environment and is not intended to suggest any limitation as to the scope of use or functionality of the embodiments described herein. Neither should the computing environment 1400 be interpreted as having any dependency or requirement relating to any one or combination of components illustrated in the exemplary operating environment 1400.

With reference to FIG. 14, an exemplary remote device includes a general purpose computing device in the form of a computer 1410. Components of computer 1410 may include, but are not limited to, a processing unit 1420, a system memory 1430, and a system bus 1421 that couples various system components including the system memory to the processing unit 1420.

Computer 1410 typically includes a variety of computer readable media and can be any available media that can be accessed by computer 1410. The system memory 1430 may include computer storage media in the form of volatile and/or nonvolatile memory such as read only memory (ROM) and/or random access memory (RAM). By way of example, and not limitation, memory 1430 may also include an operating system, application programs, other program modules, and program data.

A user may enter commands and information into the computer 1410 through input devices 1440. A monitor or other type of display device is also connected to the system bus 1421 via an interface, such as output interface 1450. In addition to a monitor, computers may also include other peripheral output devices such as speakers and a printer, which may be connected through output interface 1450.

The computer 1410 may operate in a networked or distributed environment using logical connections to one or more other remote computers, such as remote computer 1470. The remote computer 1470 may be a personal computer, a server, a router, a network PC, a peer device or other common network node, or any other remote media consumption or transmission device, and may include any or all of the elements described above relative to the computer 1410. The logical connections depicted in FIG. 14 include a network 1471, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to perform image transforms efficiently.

There are multiple ways of implementing adaptive filtering as described herein, e.g., an appropriate API, tool kit, driver code, operating system, control, standalone or downloadable software object, etc., which enables applications and services to use the adaptive image transform processes. Thus, various implementations described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiments for performing the same or similar function without deviating therefrom. Still further, adaptive filtering processes may be implemented in or across a plurality of processing chips or devices, and storage may similarly be effected across a plurality of devices. Therefore, no single embodiment should be considered limiting, but rather scope of protection should be construed in breadth and scope in accordance with the appended claims, and any equivalents.

What is claimed is:

1. A method, comprising:
   identifying a corresponding set of pixels along a segment in a source image that are to be blended to generate color values for a pixel location in a target image;
   determining whether the set of pixels along the segment in the source image are of threshold similarity based on a shifting color similarity threshold, the shifting color similarity threshold dynamically adjusted according to an interpolation algorithm usage count in previous images; and
   if the set of pixels along the segment in the source image are of threshold similarity, determining the color values of the pixel location of the target image based on fewer pixels along the segment in the source image than if the set of pixels along the segment in the source image are not of threshold similarity.

2. The method of claim 1, further comprising determining whether a distance of the pixel location in the target image from a viewer of the target image is within a pre-defined distance from the viewer.

3. The method of claim 1, wherein the determining includes determining whether a maximum color distance among the set of pixels along the segment in the source image is within a threshold color distance.

4. The method of claim 1, wherein, if the set of pixels along the segment in the source image are not of threshold similarity, performing a blending operation on color values of the set of pixels along the segment in the source image.

5. The method of claim 1, wherein the shifting color similarity threshold is adjusted in real-time.

6. The method of claim 1, wherein the shifting color similarity threshold is adjusted according to available resources.

7. The method of claim 1, further comprising dynamically changing interpolation algorithms according to a color distance among the set of pixels along the segment in the source image.

8. A computer-readable storage device, comprising:
   a memory device configured to store computer-readable instructions, the computer-readable instructions including instructions for performing acts which include:
   identifying a set of pixels in a source image corresponding to a pixel location in a target image;
   determining whether the set of pixels in the source image are of threshold similarity based on a shifting color similarity threshold, the shifting color similarity threshold dynamically adjusted according to an interpolation algorithm usage count in previous images; and
   ascertaining a color value for the pixel location in the target image from the set of pixels in the source image based on whether the set of pixels in the source image are of threshold similarity.

9. The computer-readable storage device of claim 8, the ascertaining comprising determining the color value based on fewer pixels when the set of pixels in the source image are of threshold similarity than when the set of pixels in the source image are not of threshold similarity.

10. The computer-readable storage device of claim 8, further comprising determining whether a distance between the pixel location in the target image and a viewer of the target image is within a pre-defined distance.

11. The computer-readable storage device of claim 8, wherein the determining includes determining whether a maximum color distance among the set of pixels in the source image is within a threshold color distance.

12. The computer-readable storage device of claim 8, the acts further comprising performing a blending operation on color values of the set of pixels in the source image, if the set of pixels in the source image are not of threshold similarity.

13. The computer-readable storage device of claim 8, wherein the shifting color similarity threshold is adjusted in real-time.

14. The computer-readable storage device of claim 8, wherein the shifting color similarity threshold is adjusted according to available resources.

15. The computer-readable storage device of claim 8, further comprising dynamically changing interpolation algorithms according to a color distance among the set of pixels in the source image.

16. A method, comprising:
identifying a set of pixels in a source image corresponding to a pixel location in a target image;
determining whether a distance of the pixel location in the target image from a viewer of the target image is within a pre-defined distance from the viewer;
determining whether the set of pixels in the source image are of threshold similarity based on a shifting color similarity threshold, wherein the shifting color similarity threshold is dynamically adjusted according to an interpolation algorithm usage count in previous images; and
generating a color value corresponding to the pixel location in the target image by blending the set of pixels in the source image with fewer than all of the set of pixels in the source image, if the distance is less than the pre-defined distance, wherein the generating depends on whether the set of pixels in the source image are of threshold similarity.

17. The method of claim 16, wherein the generating comprises, if the set of pixels in the source image are of threshold similarity, determining the color value corresponding to the pixel location of the target image based on fewer pixels than if the set of pixels in the source image are not of threshold similarity.

* * * * *